(12) United States Patent
Parker et al.

(10) Patent No.: US 6,280,001 B1
(45) Date of Patent: Aug. 28, 2001

(54) WASTE CONTAINER AND WHEEL ASSEMBLY WITH PULTRUDED AXLE

(75) Inventors: Brian G. Parker, Alto; Edward H. Wysocki, Kentwood; Roger D. Herrick, Grand Rapids, all of MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 0 days.

(21) Appl. No.: 09/495,748

(22) Filed: Feb. 1, 2000

Related U.S. Application Data
(60) Provisional application No. 60/123,043, filed on Mar. 5, 1999.

(51) Int. Cl.[7] .......................... B60B 37/00; B60B 27/02; B60B 27/06; B60B 23/06
(52) U.S. Cl. ......................... 301/112; 301/111; 301/122; 301/131
(58) Field of Search ..................... 301/111, 112, 301/121, 122, 126, 113, 114, 115, 131, 132

(56) References Cited

U.S. PATENT DOCUMENTS

| | | |
|---|---|---|
| Re. 30,770 | 10/1981 | Shobert et al. . |
| 3,870,371 * | 3/1975 | Solomon ............................. 301/111 |
| 4,043,685 * | 8/1977 | Hyams ................................ 301/121 |
| 4,154,634 | 5/1979 | Shobert et al. . |
| 4,193,639 * | 3/1980 | Pauly et al. ........................ 301/111 |
| 4,458,400 | 7/1984 | Friedericy et al. . |
| 4,515,737 | 5/1985 | Karino et al. . |
| 4,816,102 | 3/1989 | Cavin et al. . |
| 4,938,823 | 7/1990 | Balazek et al. . |
| 4,983,453 | 1/1991 | Beall . |
| 5,013,512 | 5/1991 | Maimstrom . |
| 5,030,408 | 7/1991 | Hirao et al. . |
| 5,120,380 | 6/1992 | Stracham . |
| 5,215,356 * | 6/1993 | Lin ..................................... 301/111 |
| 5,324,377 | 6/1994 | Davies . |
| 5,408,854 * | 4/1995 | Chiu ................................... 301/111 |
| 5,585,155 | 12/1996 | Heikkila et al. . |
| 5,632,837 | 5/1997 | Carmien . |
| 5,716,107 | 2/1998 | Parker et al. . |
| 5,884,982 * | 3/1999 | Yemini ................................ 301/111 |
| 5,957,544 * | 9/1999 | Hu ..................................... 301/111 |

* cited by examiner

*Primary Examiner*—S. Joseph Morano
*Assistant Examiner*—Jason R. Bellinger
(74) *Attorney, Agent, or Firm*—Rader, Fishman, Grauer & McGarry

(57) ABSTRACT

A waste container having a wheel assembly comprising an axle assembly on which are slidably mounted a pair of wheels. The axle assembly comprises a pultruded shaft with opposing end caps. The end caps have an indentation for receiving a retainer to retain the wheels on the shaft.

38 Claims, 3 Drawing Sheets

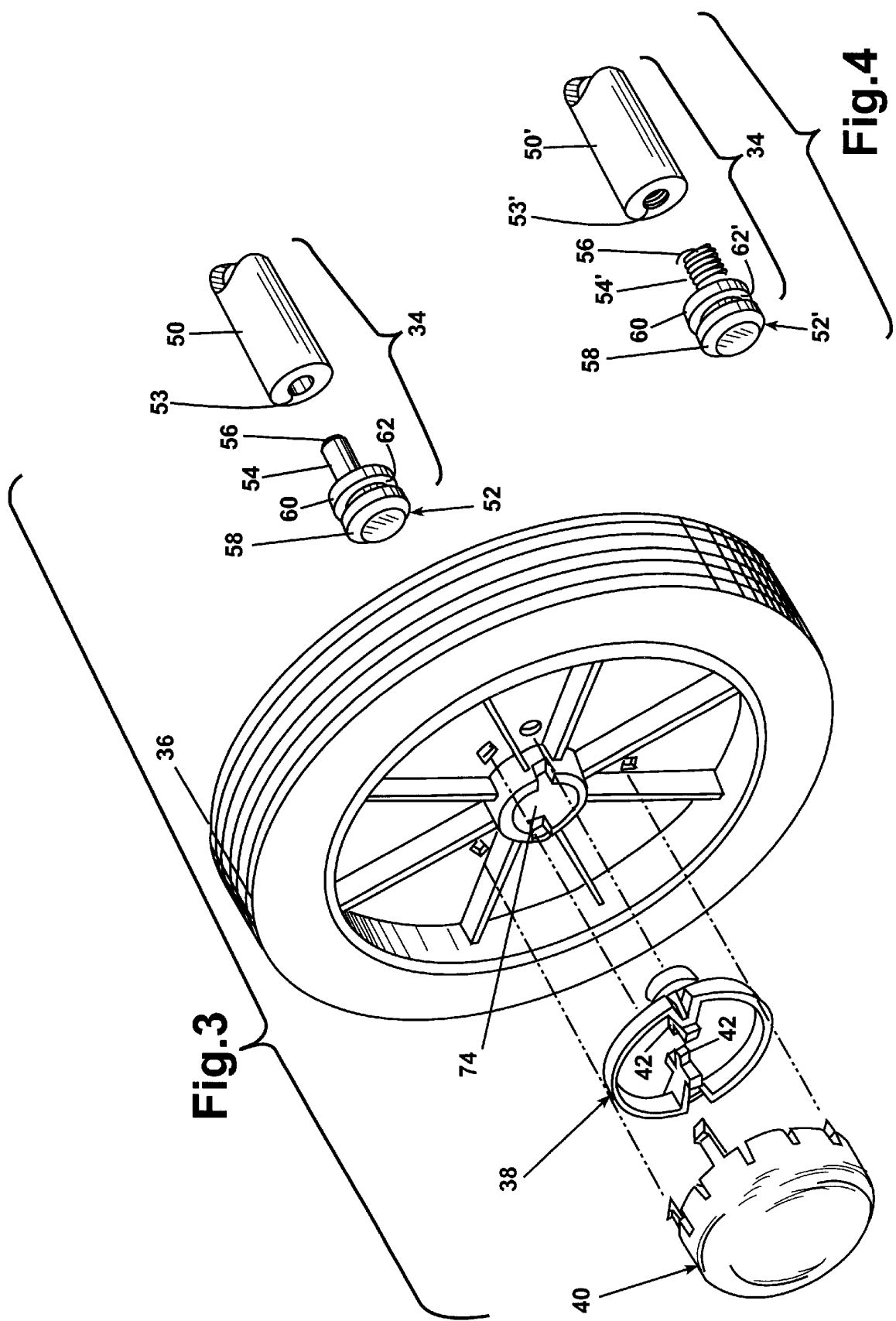

WASTE CONTAINER AND WHEEL ASSEMBLY WITH PULTRUDED AXLE

RELATED PATENT APPLICATIONS

This application claims priority on U.S. Provisional Patent Application No. 60/123,043 filed Mar. 5, 1999.

BACKGROUND OF THE INVENTION

1. Field of the Invention

The invention relates to a waste container with an external axle assembly and, in particular, a wheel assembly having a pultruded axle with opposing end caps for mounting wheels to the axle assembly.

2. Description of the Related Art

Waste containers with wheels supported by an axle assembly are well known and commonly used in waste collection systems. The wheeled waste containers increase the ease of moving the waste container, which often contains a relatively heavy load, to a curbside where the waste collection vehicle can transfer the contents of the waste container into the waste collection vehicle.

Conventional waste containers typically use an external wheel assembly incorporating a solid steel axle on which wheels are rotatably mounted on opposite ends thereof. The axles tend to corrode which results in more difficult movement of the wheels on the axle. Further, the solid axles are typically machined to provide mounting grooves and other structural elements for securing the wheel to the axle.

The cost of a solid axle and its subsequent machining is relatively expensive when compared to the overall cost of the waste container. The machining of the solid axle adds to the overall cost of the waste container and increases the manufacturing time of the waste container. Since waste containers are typically high volume items, any small reduction in the manufacturing time and relative cost is a great advantage. There is a need for a more durable and less costly wheel assembly than the prior metal axle wheel assemblies.

SUMMARY OF THE INVENTION

The invention relates to a waste container comprising a container body having a bottom wall and a peripheral wall that extends upwardly therefrom. The peripheral wall terminates in an upper edge to define an open top through which access can be had to the interior of the container body. The waste container further includes a wheel assembly comprising an axle assembly that is mounted to the container body and on which is rotatably mounted a pair of wheels. Each of the wheels has a central hub with a central opening for slidably receiving a portion of the axle assembly. The axle assembly further includes a pair of retainers mounted on the axle assembly to retain each of the wheels on the axle assembly. Each retainer has a keeper that is received in an indentation on the axle assembly to releasably retain the retainer on the axle assembly. The improvement in the waste container comprises the axle assembly comprising an elongated axle having axial bores and opposing ends and a pair of end caps. Each of the end caps has a head portion and a shank portion. The shank portion is secured in one of the axial bores of the axle and the indentation is formed in the end cap head.

The elongated axle is preferably formed by pultruding a synthetic thermoplastic resin. The end caps are preferably metal, with the indentations formed by machining grooves in the head of the end caps. Alternatively, the end caps can be made of injected molded synthetic resin.

The axial bores in the axle can be tapped and the shank of the end cap can be threaded to permit the screwing of the shank into the tapped bore. Alternatively, the shanks can be made slightly larger in diameter than the corresponding axial bore diameter so that the shanks of the end caps are press-fit into the axial bores.

In another aspect, the invention relates to a waste container comprising a container body having a bottom wall and a peripheral wall, extending upwardly from the bottom wall. The peripheral wall terminates at an upper edge to define an open top. The waste container further comprises a wheel assembly comprising an axle assembly mounted to the container body, a wheel having a central hub with a central opening for slidably receiving a portion of the axle assembly, and a retainer releasably mounted to the axle assembly for releasably retaining the wheel on the axle. The improvement in the waste container comprises the axle assembly comprising an elongated axle formed of a pultruded fiber-filled synthetic resin and further comprising a pair of separate end caps, each of which is mounted to an opposing end of the axle.

In yet another aspect, the invention relates to a wheel assembly comprising a wheel having a central hub with a central opening. The wheel assembly further includes an axle assembly comprising an elongated axle formed of a pultruded fiber-filled synthetic resin and further comprising a pair of separate end caps, each of which is mounted to an opposing end of the axle. Additionally, the wheel assembly includes a retainer mounted to the end cap and of a size to block the sliding removable of the wheel from the end of the axle.

BRIEF DESCRIPTION OF THE DRAWINGS

In the drawings:

FIG. 3 is an enlarged exploded partial view of the axle assembly of FIG. 2; and

FIG. 4 is an alternative construction for the axle assembly according to the invention.

DESCRIPTION OF THE PREFERRED EMBODIMENT

Figure 1:
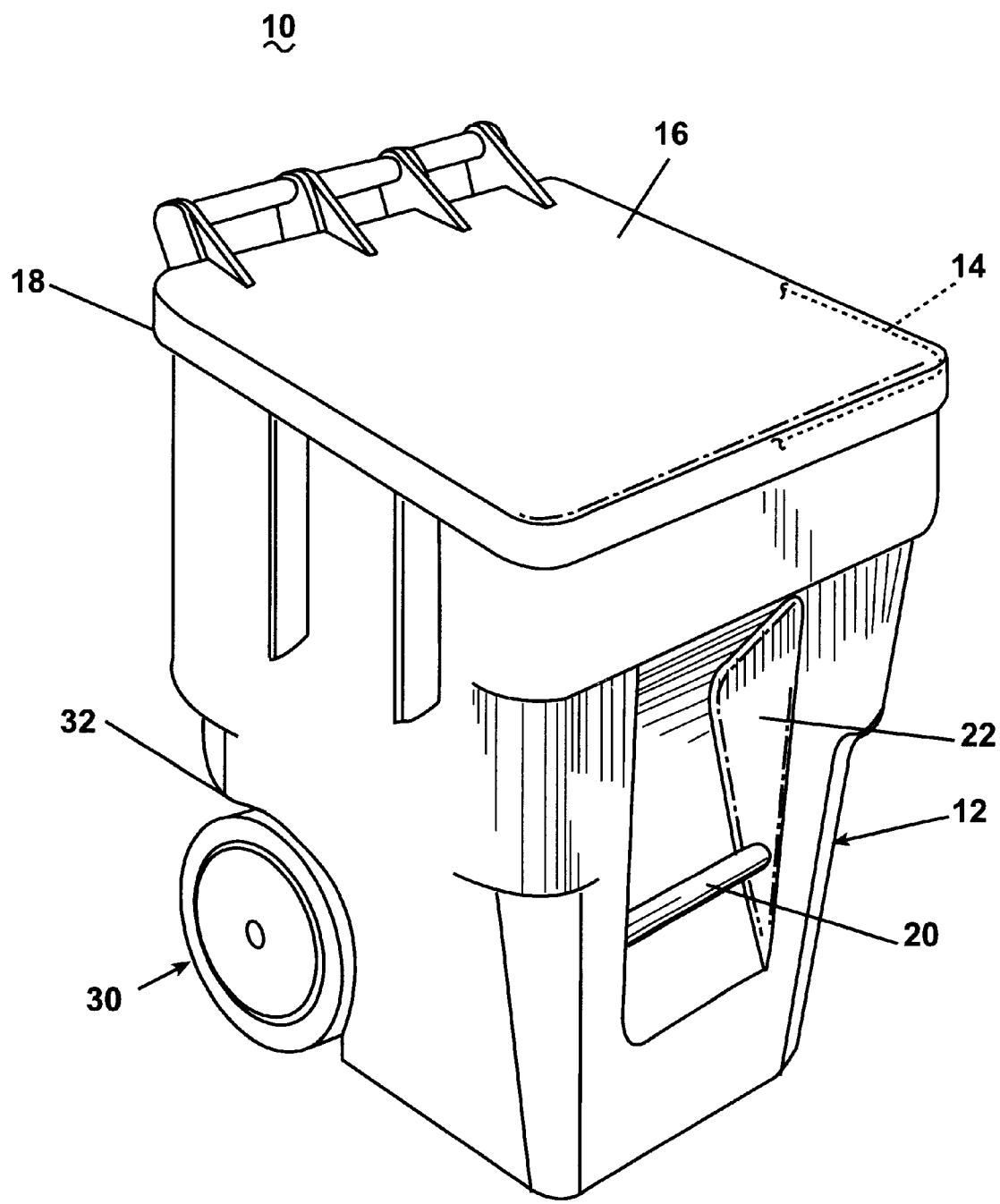
FIG. 1 is a perspective view of a waste container according to the invention and including an axle assembly also according to the invention.

Referring now to the drawings and to FIG. 1 in particular, a waste container 10 comprises a body 12 having an open top 14, which is closed by a cover 16. The cover 16 is preferably hingedly mounted to a handle 18 extending from a rear side of the body 12 by a hinge pins 19. A grab handle 20 is provided in a depressed area 22 on a front side of the body 12.

Figure 2:
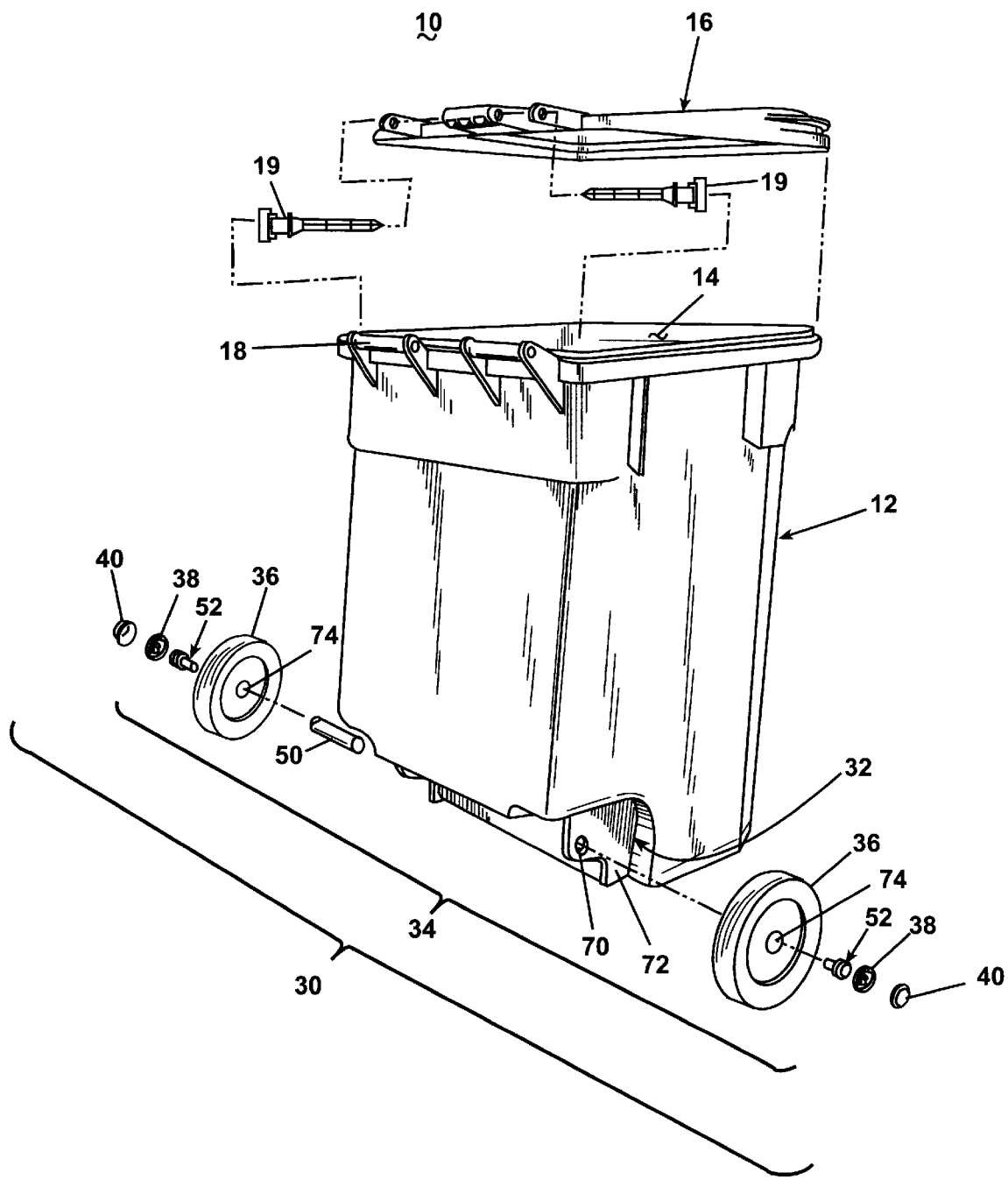
FIG. 2 is a rear view of the waste container of FIG. 1 and showing the axle assembly in exploded view.

Referring to FIG. 2, the waste container 10 further comprises a wheel assembly 30, which is preferably located in an inset portion 32 at the lower rear of the body 12. The wheel assembly facilitates movement of the waste container to a desired location, such as a suitable position for dumping the contents of the body 12 into a waste collection vehicle.

Referring to FIGS. 2 and 3, the wheel assembly 30 comprises an axle assembly 34 on which is mounted a pair of wheels 36, which are secured to the axle by a retainer ring 38. The retainer ring 38 is preferably resilient and includes opposing keepers 42 that can be radially expanded. A cover 40 is provided to mount over the retainer ring 38 and to the wheel 36 to hide the retainer ring 38 and protect from the inadvertent disconnection of the retainer ring 38. The retainer ring 38 is disclosed in more detail and claimed in U.S. Pat. No. 5,716,107, which is incorporated herein and claimed by reference.

The axle assembly 34 comprises an axle 50 and opposing axle end caps 52. The axle 50 is preferably tubular and, thus, has a central bore 53 defining a hollow interior. Each axle end cap 52 comprises a shank 54, which has one end terminating in a tapered portion 56 to aid insertion of the shank 54 into the central bore 53 of the axle 50. A cap 58 is positioned at the other end of the shank 54. The cap 58 has an outer diameter that is greater than the outer diameter of the shank 54 and generally equal to the diameter of the axle 50. A collar 60 is disposed on the shank 54 and spaced from the cap 58. Preferably, the collar 60 has an outer diameter substantially equal to the maximum outer diameter of the cap 58 and the outer diameter of the axle 50. A space between the cap 58 and the collar 60 defines a snap channel 62 sized to receive the keepers 42 of the snap ring.

The axle 50 is preferably made with a pultrusion process. Pultrusion is a process for continuously forming reinforced plastic materials having a uniform cross-sectional profile. The word "pultrusion" is a hybrid, which combines the words "pull" and "extrusion". The product is literally pulled through a forming die. In its most usual form, pultrusion involves feeding a multiplicity of fiberglass roving strands, with or without additional plies of glass mat of appropriate width, into a pultrusion die. A resin, normally a thermosetting material such as a polyester, is injected into the die where it is uniformly distributed among the reinforcing materials. Alternatively, the reinforcing material may be drawn through a resin bath prior to entry into the die. The die itself is heated. As the product is drawn from the die, the resin is either cured, or very nearly cured. The endless product so formed is then cut to appropriate length. Many variations of this general process have been developed as the technology has matured. An example of a pultrusion process is disclosed in U.S. Pat. No. 5,632,837, which is incorporated herein by reference. Alternatively, a solid pultruded rod can be formed, cut to length and bored at the ends to form blind holes. The blind holes should be of sufficient length to permit the shank 54 to be received therein up to the collar 60.

Preferably, the outer diameter of the bore 53 of the axle 50 is slightly less than the outer diameter of the shank 54 to provide a tight press-fit between the shank 54 and the hollow axle 50. However, it is also within the scope of the invention for alternative constructions in the connection of the shank 54 to the axle 50. FIG. 4 illustrates one alternative wherein the shank 54' is provided with a series of threads and the axle end caps 52' can then be threaded into a tapered bore 53' in the end of the axle 50'. Other alternatives include barbs or other protuberances onto the shank 54 to improve the mechanical coupling of the shank with the interior of the axle 50. A pin can extend through both the axle 50 and through the shank 54. Also, an adhesive or other suitable chemical fasteners can be used to improve the mechanical connection between the shank 56 and the hollow interior of the axle 50. The adhesive can be used alone or in combination with one of the mechanical fasteners.

Preferably, the fibers used in making the pultruded axle can be strands of glass coated in a suitable resin that when cured results in a composite commonly known as fiberglass. An axle made according to the invention from fiberglass would typically have a tensile strength of at least 60,000 psi and a flexural modulus of at least 5,000,000 psi. The hollow interior of the axle 50 can also be filled during the pultrusion process with a soft-core material to improve the flexural modulus.

The end caps 52 are preferably injection molded as a single piece from a suitable resin, such as nylon. Alternatively, the end caps 52 can machined from a suitable metal. However, the machining of end caps from a suitable metal is less desirable because of the increased manufacturing time and cost.

To assemble the wheel assembly 30, the end caps 52 are attached to the axle 50 by inserting the tapered portion 56 of the shank 54 into the hollow interior of the axle 50 until the collar 60 abuts the end of the axle to form the axle assembly. The axle assembly 34 is then inserted through opening 70 and support braces 72 located in the inset portion 32 of the waste container body 12. A wheel 36 is then slid over each of the end caps 52 by inserting the end caps 52 through openings 74 in the center of the wheels. The wheels 36 are slid onto the axle a sufficient distance so that the snap channel 62 is located on the exterior side of the wheel 36. The resilient retainer ring 38 is then deflected radially outward to permit the keepers to ride up and over the end caps 52 and snap into the grooves 62 to retain the wheel on the axle assembly 34. The cover 40 is preferably mounted to the wheel prior to mounting the wheel to the axle.

It should be noted that the retainer ring 38 and cover 40 do not form an essential part of the invention and any other suitable means or keeper for connecting the wheel to the axle assembly is within the scope of the invention. For example, a transverse opening through the end caps 52 and a cotter pin or similar locking device can be inserted through the opening to affix the wheel to the axle assembly 34. End caps alone can be used to keep the wheels on the axle.

The waste container 10 according to the invention is an improvement over previous waste containers in that the axle assembly 34 comprises a pultruded axle 50 with end caps 52 that can be easily and inexpensively manufactured and assembled, unlike the solid metal machine axle assemblies of prior waste containers. Additionally, the pultruded axle and end cap according to the invention are preferably made from non-corrosive material that will not corrode over time, unlike the metal axle assemblies of prior waster containers. Therefore, the waste container and axle assembly of the invention is not only more cost effective and easier to manufacture and assemble than previous axle assemblies, but the axle assemblies according to the invention also will have a longer useful-life than previous axle assemblies.

While the invention has been specifically described in connection with certain specific embodiments thereof, it is to be understood that this description of the invention is by way of illustration and not of limitation. Reasonable variation and modification are possible within the scope of the forgoing disclosure without departing from the spirit of the invention.

What is claimed is:

1. In a waste container comprising a container body having a bottom wall and a peripheral wall extending therefrom and terminating in an upper edge to define an open top, and a wheel assembly comprising an axle assembly mounted to the container body and mounting a pair of wheels, each wheel having a central hub with a central opening for slidably receiving a portion of the axle assembly, and a pair of retainers mounted on the axle assembly for retaining each of the wheels on the axle assembly, each retainer has a keeper which is received in an indentation in the axle assembly to releasably retain the retainer on the axle assembly, the improvement comprising:

the axle assembly comprises an elongated axle having axial bores in opposing ends and a pair of end caps, each of the end caps having a head portion and a shank portion, and the shank portion is secured in one of the axial bores of the axle and wherein the indentation is formed in the end cap head.

2. The waste container according to claim 1 wherein the axle is formed by pultruding a synthetic thermoplastic resin.

3. The waste container according to claim 2 wherein the end caps are metal.

4. The waste container according to claim 3 wherein the indentations are machined grooves.

5. The waste container according to claim 2 wherein the end caps are injection molded of a synthetic resin.

6. The waste container according to claim 1 wherein the end caps are metal.

7. The waste container according to claim 1 wherein the end caps are injection molded of a synthetic resin.

8. The waste container according to claim 1 wherein each of the axial bores is tapped and a portion of the shank is threaded so that the end caps are mounted to the pultruded axle by screwing the shank into the tapped bores.

9. The waste container according to claim 1 wherein each of the shanks are slightly larger in diameter than the corresponding axial bore diameter so that the end caps are mounted to the axle by press fitting the shanks into the axial bores.

10. The waste container according to claim 1 wherein the axle is hollow to form the axial bores.

11. The waste container according to claim 1 wherein the axle is a non-metal tube.

12. The waste container according to claim 11 wherein the end caps are injection molded of a synthetic resin.

13. In a waste container comprising a container body having a bottom wall and a peripheral wall extending therefrom and terminating in an upper edge to define an open top, and the wheel assembly comprising an axle assembly mounted to the container body, the wheel having a central hub with a central opening for slidably receiving a portion of the axle assembly, and a retainer releasably mounted to the axle assembly for releasably retaining the wheel on the axle, the improvement comprising:
the axle assembly comprises an elongated axle formed of a pultruded fiber filled synthetic resin and further comprises a pair of separate end caps, each of which is mounted to an opposing end of the axle and is of a size to pass through the wheel hub central opening.

14. The waste container according to claim 13 wherein the elongated axle has axial bores extending into each of the first and second ends and the end caps comprise a head and a shank extending from the head and received within the axial bores.

15. The waste container according to claim 14 wherein each of the axial bores is tapped and a portion of the end cap shanks is threaded whereby the end caps are threadably mounted in the tapped bores of the pultruded axle.

16. The waste container according to claim 14 wherein each of the shanks are slightly larger in diameter than the corresponding end opening diameter so that the end caps are press fit in the axial bores of the pultruded axle.

17. The waste container according to claim 13 wherein the end caps are metal.

18. The waste container according to claim 13 wherein the end caps are injection molded of a synthetic resin.

19. A wheel assembly comprising:
a wheel having a central hub with a central opening;
an axle assembly comprising an elongated axle formed of a pultruded fiber filled synthetic resin and further comprising a separate end cap which is mounted to an end of the axle and of a size to pass through the wheel central hub central opening, and the wheel is rotatably mounted to the axle assembly, with the axle assembly received within the central opening; and
a retainer mounted to the end cap and of a size larger than the central opening to block the sliding removal of the wheel from the end of the axle.

20. The wheel assembly according to claim 19 wherein the elongated axle has axial bores extending into each of the first and second ends and the end caps comprise a head and a shank extending from the head and received within the axial bores.

21. The wheel assembly according to claim 20 wherein each of the axial bores is tapped and a portion of the end cap shanks is threaded whereby the end caps are threadably mounted in the tapped bores of the pultruded axle.

22. The wheel assembly according to claim 20 wherein each of the shanks are slightly larger in diameter than the corresponding end opening diameter so that the end caps are press fit in the axial bores of the pultruded axle.

23. The wheel assembly according to claim 20 wherein the shanks are adhesively secured in the axial bores of the pultruded axle.

24. The wheel assembly according to claim 20 wherein the shanks are mechanically secured in the axial bores of the pultruded axle.

25. The wheel assembly according to claim 19 wherein the end caps are injection molded of a synthetic resin.

26. A waste container comprising:
a container body having a bottom wall and a peripheral wall extending therefrom and terminating in an upper edge to define an open top; and
a wheel assembly comprising:
an axle assembly mounted to the container body and comprising:
an elongated axle formed of a pultruded fiber filled synthetic resin and terminating in a first end, with an axial bore extending into first end, and
an end cap having a head and a shank, the shank extending from the head and received within the axial bore to mount the end cap to first end of the axle,
a wheel having a central hub with a central opening for slidably receiving a portion of the axle assembly, and
a retainer releasably mounted to the axle assembly for releasably retaining the wheel on the axle.

27. The waste container according to claim 26 wherein the axial bore is tapped and a portion of the end cap shank is threaded whereby the end cap is threadably mounted in the tapped bore of the pultruded axle.

28. The waste container according to claim 26 wherein the shank is slightly larger in diameter than the corresponding end opening diameter so that the end caps are press fit in the axial bores of the pultruded axle.

29. The waste container according to claim 26 wherein the end cap is metal.

30. The waste container according to claim 26 wherein the end cap is injection molded of a synthetic resin.

31. A waste container comprising:
a container body having a bottom wall and a peripheral wall extending therefrom and terminating in an upper edge to define an open top; and
a wheel assembly comprising:
a wheel having a central hub with a central opening,
an axle assembly mounted to the container body and having a portion received within the central opening, and comprising an elongated axle formed of a pultruded fiber filled synthetic resin and terminating in a first end, and an end cap mounted to the first end of the axle, and a retainer mounted to the axle assembly and of a size to abutt a portion of the wheel when the wheel is moved in an axial direction along the axle assembly to block the sliding removal of the wheel from the axle assembly.

32. The waste container according to claim 31 wherein the elongated axle has axial bores extending into the first end and the end cap comprises a head and a shank extending from the head and received within the axial bore.

33. The waste container according to claim 32 wherein the axial bore is tapped and a portion of the end cap shank is threaded whereby the end cap is threadably mounted in the tapped bore of the pultruded axle.

34. The waste container according to claim 32 wherein the shank is slightly larger in diameter than the corresponding end opening diameter so that the end caps are press fit in the axial bores of the pultruded axle.

35. The waste container according to claim 32 wherein the end cap is metal.

36. The waste container according to claim 32 wherein the end cap is injection molded of a synthetic resin.

37. The waste container according to claim 32 wherein the end cap is of a size to pass through the central opening.

38. The waste container according to claim 37 wherein the retainer is mounted to the end cap and is of a size larger than the central opening to block the sliding removal of the wheel from the axle assembly.

* * * * *